Sept. 16, 1941.    H. A. HADLEY    2,256,318
BEARING STRUCTURE
Filed Nov. 27, 1939
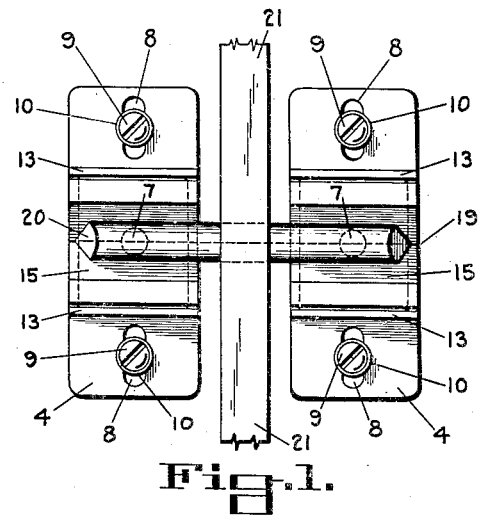
Fig. 1.
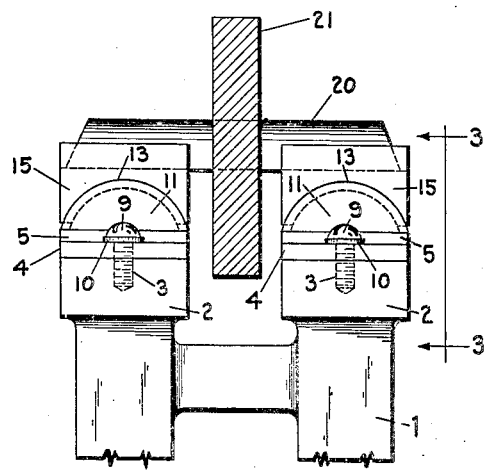
Fig. 2.
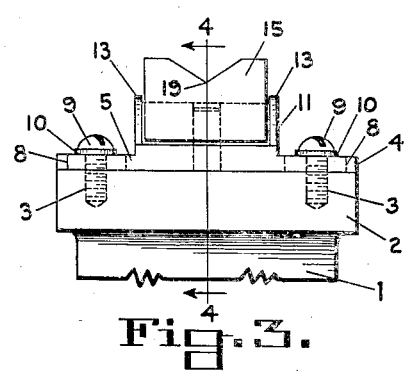
Fig. 3.
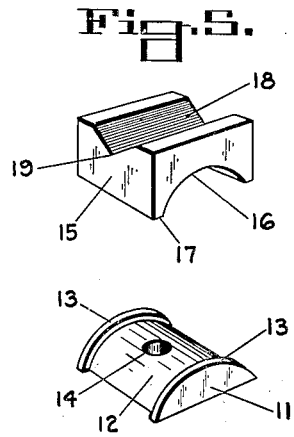
Fig. 5.
Fig. 6.
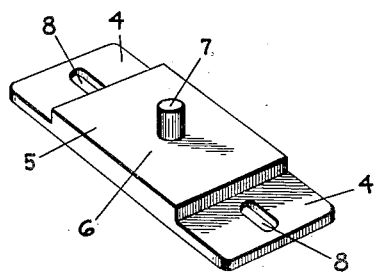
Fig. 7.
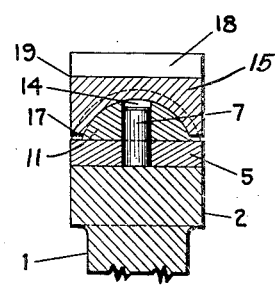
Fig. 4.
INVENTOR
HARLAN A. HADLEY
BY
Paul L. Kuhn
ATTORNEY Patented Sept. 16, 1941

2,256,318

UNITED STATES PATENT OFFICE 2,256,318

BEARING STRUCTURE

Harlan A. Hadley, River Edge, N. J., assignor to Fairbanks, Morse & Co., Chicago, Ill., a corporation of Illinois Application November 27, 1939, Serial No. 306,283

7 Claims. (Cl. 308—2)

This invention relates to improvements in bearing structures, and more particularly to an improved bearing means suitable to the pivotal support of knife-edge pivots and the like, the bearing being constructed and arranged so as to render it capable of self-adjustment in the application of a knife-edge pivot thereto, for the attainment of a true line-contact seating of the knife-edge pivot on the bearing.

While the improved bearing is suitable for use in any structural assembly requiring such a bearing, it has particular utility in connection with weighing scales, wherein accuracy in the pivotal mounting of operative elements of the weighing mechanism, is of prime importance. Accordingly, in the illustrated embodiment, the invention is shown as applied in conjunction with a beam or lever of a weighing scale, the bearing being mounted on the upper end of the beam stand and co-operating with the knife-edge pivot to retain the pivot in true line-contact therewith.

It has been a prevalent practice heretofore, in the manufacture of weighing scales and other precision instruments, to employ non-metallic bearings for supporting pivotal elements thereof, and by reason of the inherent characteristics of such bearings, it has been necessary generally, to mount them in cement. Setting the bearing in cement requires great skill on the part of the operative, in order to attain proper mounting, and exact alignment in the instance of companion bearings for knife-edge pivots. After cementing the bearings to the frame supports therefor, the frames in many cases, are heated to effect rapid drying and hardening of the cement setting. As a result, the frames frequently become slightly warped, which more often than not, disturbs the original setting and alignment of the bearings. Accordingly, an important object of the present invention is to provide an improved self-adjusting bearing structure which fully obviates the foregoing disadvantages and wherein the use of a cement setting is unnecessary.

Another important object of the invention resides in the provision of an improved bearing structure which is fully self-adjustable relative to the pivot element supported thereon, thereby facilitating accurate pivotal assembly of a pivot element to the bearing.

A further object resides in the provision of a self-adjustable bearing for the purpose indicated, which compensates for any longitudinal and/or vertical misalignment of the pivotal member and its pivot element, in the final assembly, and further, compensates for any physical and/or assembly inaccuracies in the scale structure which otherwise, might adversely affect proper pivotal mounting of the pivot member.

Yet another object is provide a bearing of the type indicated, as one fully capable of self-adjustment and self-alignment relative to the knife-edge pivot supported thereby, which is of simple and compact construction, and which may be readily and economically manufactured.

Further objects and advantages attained by the invention will appear readily from the following description of a preferred embodiment thereof, as illustrated in the accompanying drawing, in which:

Fig. 1 is a top or plan view of a scale beam mounting arrangement, showing a knife-edge pivot for the beam, pivotally journalled upon bearings constructed according to the present invention;

Fig. 2 is an end elevation of the arrangement shown by Fig. 1;

Fig. 3 is a side elevation taken on line 3—3 of Fig. 2, showing the assembled bearing as mounted on a support therefor;

Fig. 4 is a sectional view of the bearing assembly and support, as taken on the line 4—4 of Fig. 3; and Figs. 5, 6 and 7 are perspective views of the bearing block, saddle block, and bearing base or seat respectively, illustrating the structural details of each.

Referring to the drawing by suitable characters of reference, the numeral 1 designates generally, a frame member which may be a part of the frame of a weighing scale assembly, the frame member providing spaced, flat-topped head portions 2, each provided with tapped holes 3. On the flat top surface of each head 2 is positioned a plate-like member 4 which forms the base of the improved bearing assembly of this invention. The central portion 5 of the member 4 is raised as shown, and the surface thereof is preferably machined to provide a smooth and flat bearing surface 6 serving as a seat for another element of the bearing assembly later to be described. The plate member is apertured centrally of its raised seat portion 5, for the reception of a pivot pin 7 which is suitably secured therein and which projects above the raised seat. Adjustable securement of the plate member 4 upon the head 2 may be effected in the manner indicated, as by end slots 8 in the plate and suitable screws 9 and lock washers 10, the screws projecting through the slots and threadedly seating in the tapped apertures 3 in the head 2. As appears in Fig. 1 in particular, the plate slots 8 are directed longitudinally of the plate, to provide for adjustable positioning of the latter, longitudinally of the head 2.

A saddle block 11 formed with a curved or rounded upper surface 12, is mounted on the seat 6 of the bearing plate 4, and is provided with shoulders 13 at the ends of the curved surface. A circular opening 14 extending through the center portion of the saddle block, is adapted to receive the projecting pin 7 on the raised portion or table 5 of the bearing plate 4. The pin 7 is of such length relative to the depth of the saddle block in the zone of the opening 14, that it terminates inwardly of the upper open end of the opening 14, as can be seen in Fig. 4, thereby preventing projection of any part of the pin above the surface 12. The opening 14 is of such diameter as to allow the saddle block 11 to pivot smoothly about the pin 7, thereby adapting the saddle block for movement in a manner to compensate for longitudinal misalignment of the pivots, as will readily appear from the drawing.

Completing the bearing assembly is a bearing block 15 which is adapted for seating upon the curved surface 12 of the saddle block 11, as by the provision of an inwardly curved groove or depression 16 in the lower or under side of the bearing block, the curvature of which conforms to that of the surface 12. The arcuate extent of groove 16 is less than that of surface 12, so that the bearing block may rock upon the saddle block, such rocking displacement of the bearing block being limited in any suitable manner, as in the present example, by abutment of the end portions 17 thereof, with portions of the base 5 (Fig. 4) which extend outwardly beyond the saddle member. Such provision for rocking movement of the bearing block relative to the saddle block, enables self-adjustment of the bearing block to compensate for horizontal misalignment in the pivotal assembly, as when the knife-edge pivot to be pivotally supported by the bearing, is displaced so that its axis is not horizontal. The shoulders 13 of the saddle block serve to retain the bearing block 15 in position on the saddle block, but as will appear in Fig. 3, the extent of the bearing block between the shoulders is such as to provide for a small clearance therebetween, to permit some slight displacement of the bearing block relative to the shoulders, apart from its rocking movement, as a further misalignment compensating feature. The upper portion of the bearing block 15 is cut-away, to form a central V-shaped depression 18, the apex 19 of which provides a knife-edge bearing seat for a knife-edge pivot element 20, the latter carried by and forming a pivotal support for a scale beam or lever 21. As appears in the drawing, the knife-edge bearing seat extends at a right angle to the axis of the curved under surface of the bearing block, for an obvious reason.

In the assembly showing of Figs. 1 and 2, the bearing structures on the frame heads 2, are secured thereto in relatively adjusted positions such that the knife-edge seats in the bearing blocks are in axial alignment, this being readily effected through the screw and slot arrangement 8—9 permitting such adjustment. Thereafter, the beam 21 and its knife-edge pivot 20 may be mounted, with the pivot spanning the two bearings and pivotally seating in the knife-edge seats of the latter. The provision for rocking movement of the bearing block 15 on the saddle element 11, and for pivotal movement of both as a unit, about the pin 7 as a vertical axis, fully adapts the bearing structures for self-adjustment relative to the beam pivot 20, to effect a true line-contact of the pivot knife-edge with the knife-edge bearing seats of the bearings.

While it is preferred to form the elements 4 and 11 of the bearing assembly, from suitable metallic stock, the bearing block 15 may be formed from either metallic or non-metallic material, subject primarily to the condition that whatever material is selected, it must be characterized by a wear-hardness to withstand wear resulting from the knife-edge contact thereof with the pivot 20. This last condition obtains in particular, in knife-edge pivoting of beams in weighing scales.

It will be readily seen that I have disclosed a bearing structure which is fully capable of self-adjustment in assembly, in a manner to insure a line-to-line engagement of the bearings with the knife-edge pivot. Thus the improved self-adjusting bearings are effective to maintain proper line-contact seating of the knife-edge pivot, to the end of providing for accurate pivotal mounting of the scale beam or the like.

While I have shown a preferred embodiment of my invention, it is evident that changes and modifications in the construction herein shown and described may be made that would come within the scope of the invention and it is not intended, therefore, to limit the invention to the precise details of construction shown.

I claim:

1. In a bearing assembly of the type described, a base having a central planar bearing seat, and a pair of bearing elements, one thereof adapted for surface engagement with said seat, said elements being arranged on said bearing seat for pivotal movement as a unit, about a vertical axis, the other of said elements being in supported, surface contact engagement with the said one thereof and movable relative thereto, about a horizontal axis.

2. In a bearing assembly of the type described, a base, and a pair of relatively movable bearing elements mounted thereon for pivotal movement as a unit, about a vertical axis, one of said elements being formed to provide a retaining seat for the other, adapted in cooperation with said base, for confining the latter element to a rocking movement relative to said one element, about a horizontal axis.

3. In a bearing assembly of the type described, a base having a planar bearing seat and provided with an upstanding pivot pin centrally of said seat, a member having a planar bearing surface in engagement with said bearing seat and arranged for pivotal movement on the seat about said pin, and a bearing element, said member providing a seat for said element, adapted for permitting a rocking movement of the element thereon.

4. In a bearing assembly of the type described, a base providing a planar bearing seat, a member mounted on said bearing seat for pivotal movement thereon, about a vertical axis, and a bearing element, said member being formed to provide a mounting seat for said bearing element, adapted for permitting a rocking movement of the element thereon, about a horizontal axis, said base cooperating with said member in limiting the rocking movement of said bearing element.

5. In a bearing assembly of the type described, a base having a planar bearing seat and provided with a pivot pin upstanding on said bearing seat, a member arranged on said bearing seat for pivotal movement about said pin, said member being formed to provide end shoulders and a curved surface therebetween, and a bearing element adapted for seating on said curved surface, for rocking movement thereon, said end shoulders serving to limit movement of the bearing element endwise of the member.

6. In a bearing assembly of the type described, a base having a substantially planar bearing surface and provided with an upstanding pivot pin centrally of said bearing surface, a member arranged on said base and having a mating bearing surface engaging the bearing surface of the base, said member being provided with an aperture centrally thereof, to receive said upstanding pin, whereby said member is freely pivotal on said base about the pin as an axis, said member being formed to provide an arcuate bearing seat and end shoulders thereon, and a grooved bearing block having an arcuate recess in the under surface thereof, adapting the block for rockable seating on the arcuate bearing seat of said member, said end shoulders serving to limit movement of the bearing block endwise of the member, and said base cooperating with said member in limiting rocking movement of the bearing block relative to the member.

7. In combination with a support and a lever provided with a pivot element, a bearing base adjustably secured upon the support, said base having a substantially planar bearing seat, a member arranged on said bearing seat for pivotal movement thereon, about a vertical axis, said member being formed to provide an arcuate seat, and a bearing element received on said seat and adapted for rocking displacement thereon, said bearing element providing a pivotal support for said lever pivot element.

HARLAN A. HADLEY.